Feb. 18, 1941. E. G. BAILEY ET AL 2,231,872
RADIANT BOILER
Filed April 16, 1937 10 Sheets-Sheet 1

INVENTORS
Ervin G. Bailey
Thomas C. Toomey
Rolfe Shellenberger
BY
ATTORNEY.

Feb. 18, 1941.     E. G. BAILEY ET AL     2,231,872
RADIANT BOILER
Filed April 16, 1937     10 Sheets-Sheet 2

INVENTORS
Ervin G. Bailey
Thomas C. Toomey
Rolfe Shellenberger
BY
ATTORNEY.

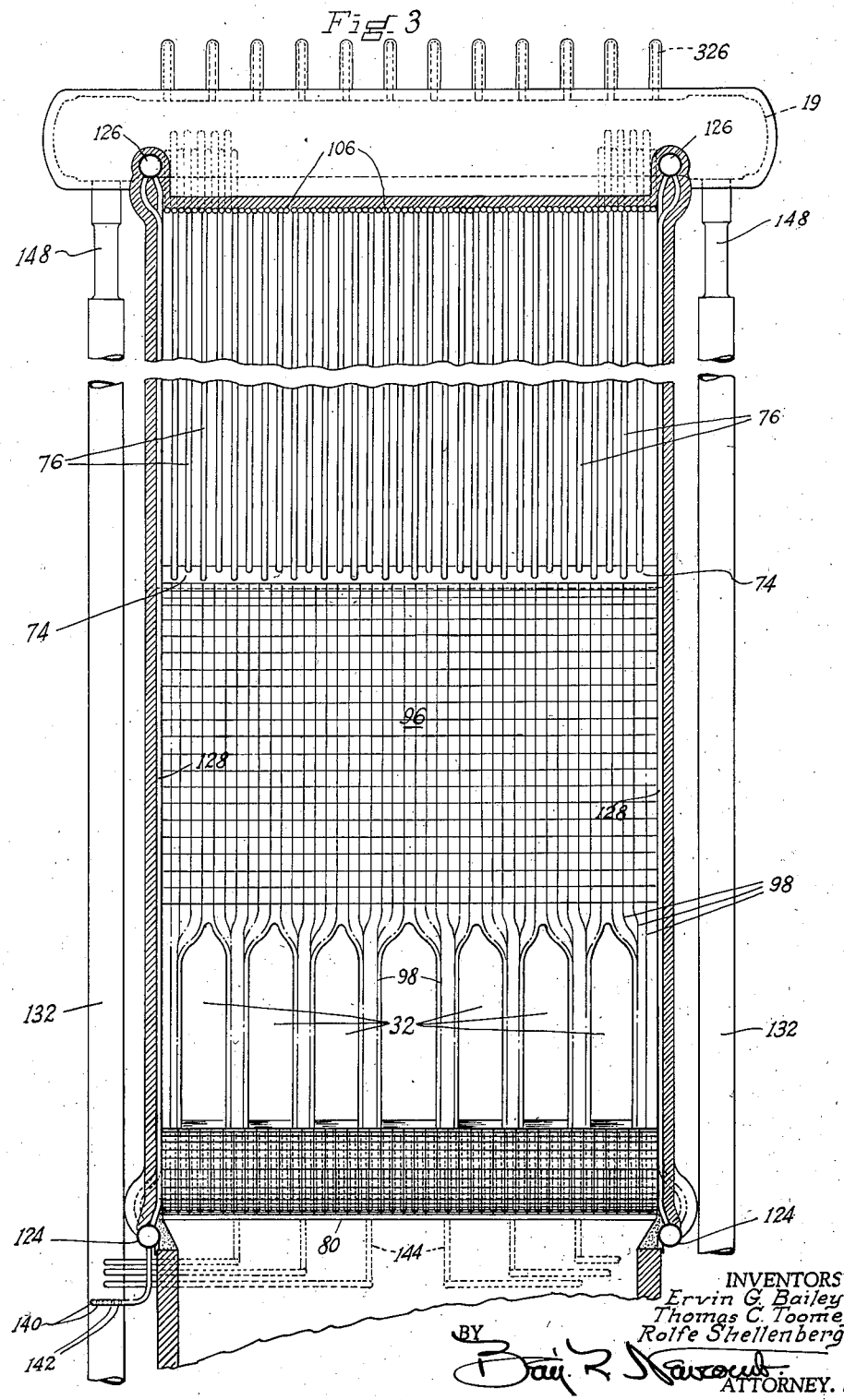

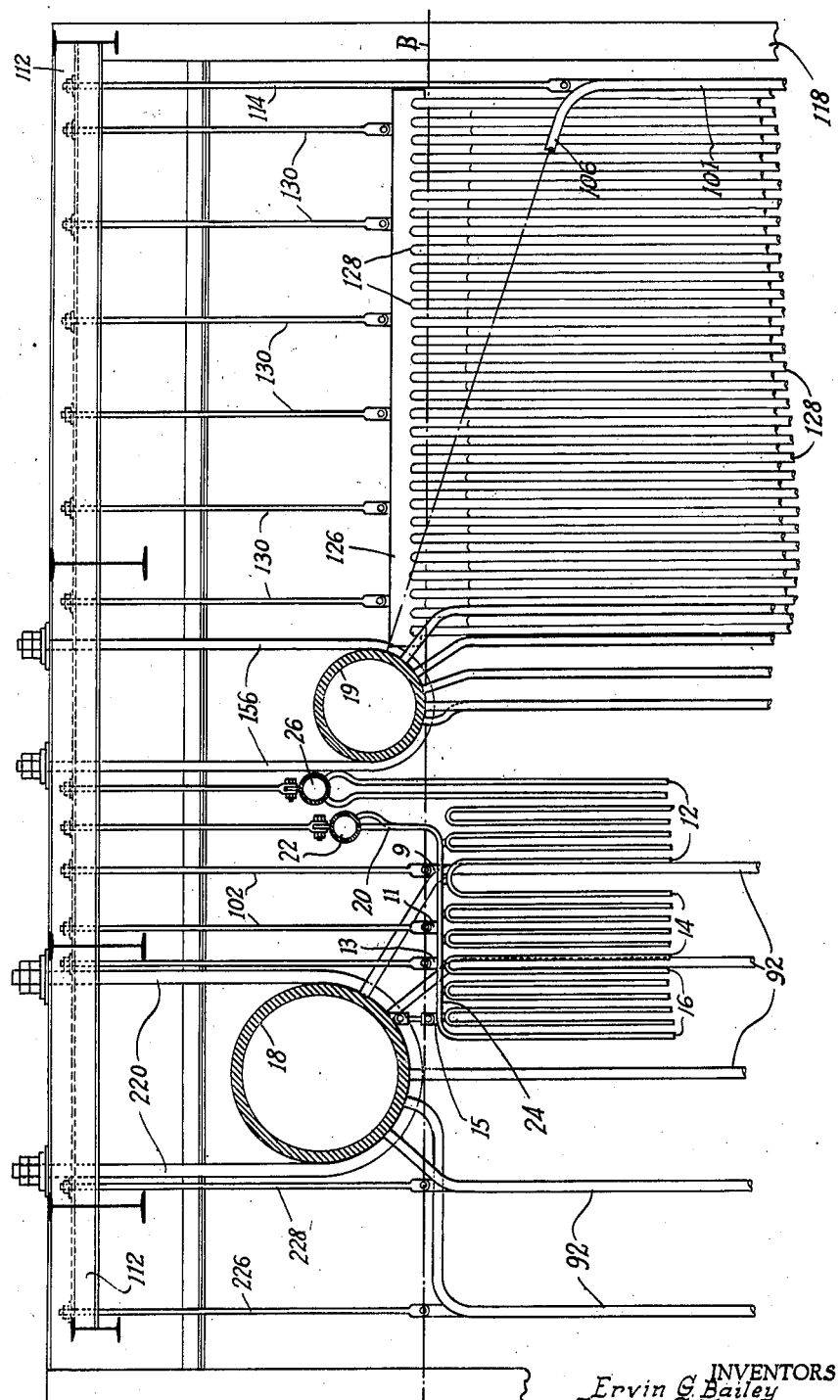

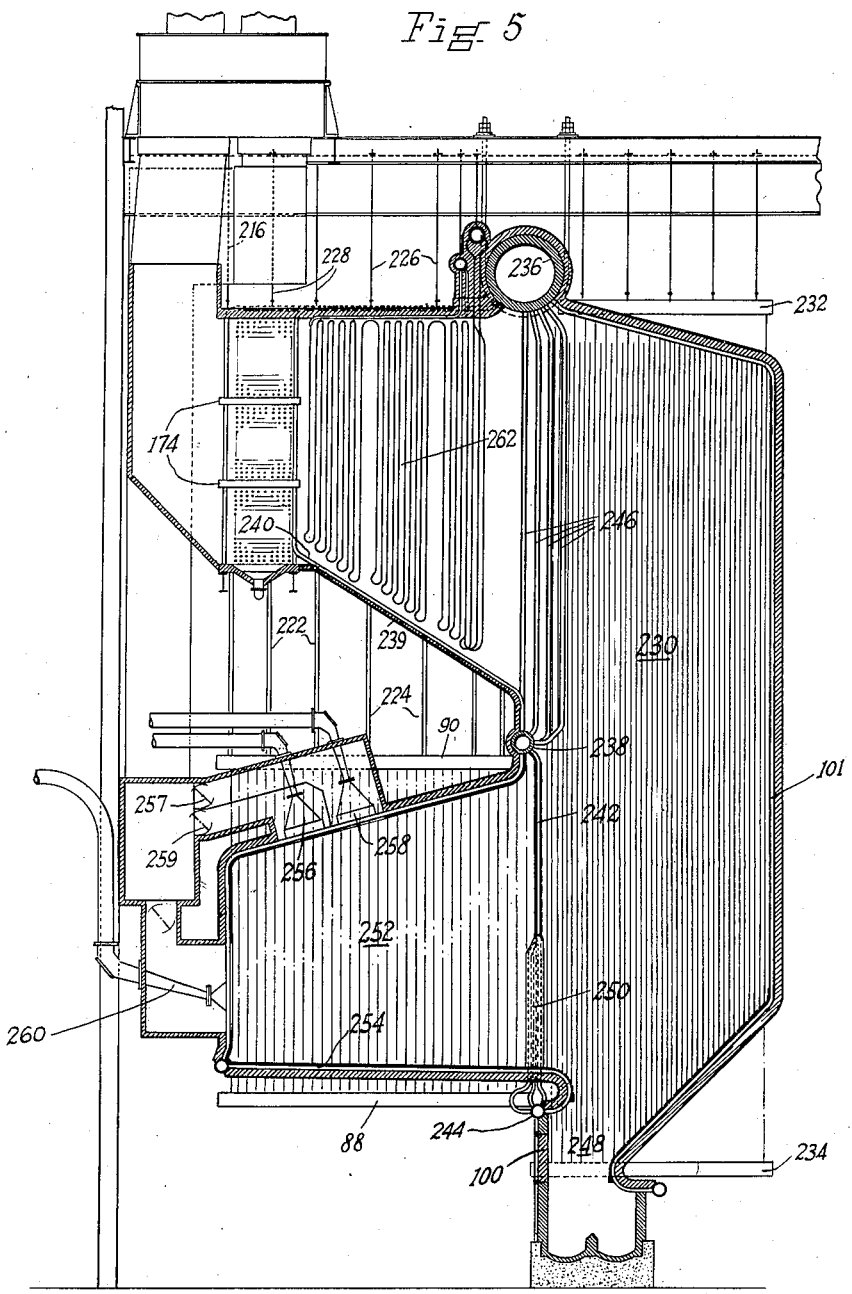

Feb. 18, 1941. E. G. BAILEY ET AL 2,231,872
RADIANT BOILER
Filed April 16, 1937 10 Sheets-Sheet 6
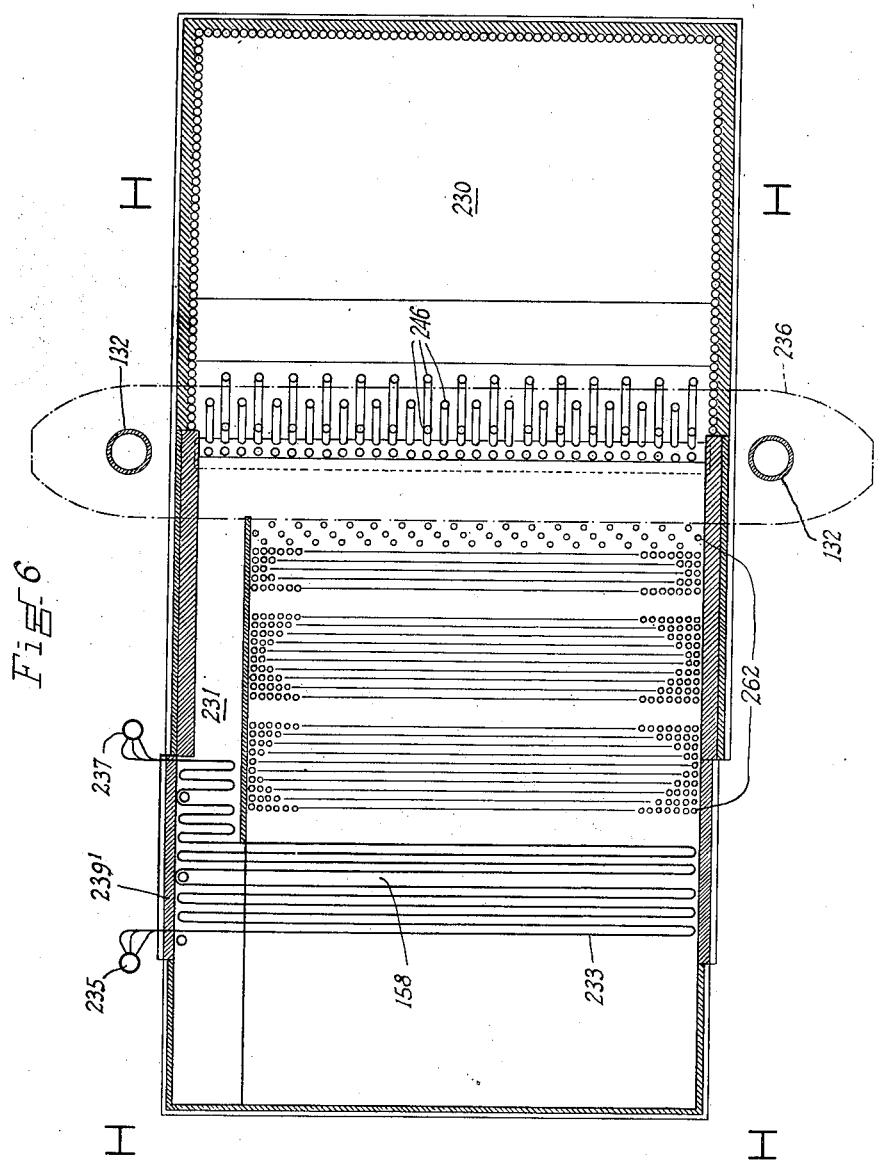
INVENTORS
Ervin G. Bailey
Thomas C. Toomey
Rolfe Shellenberger
BY
ATTORNEY.

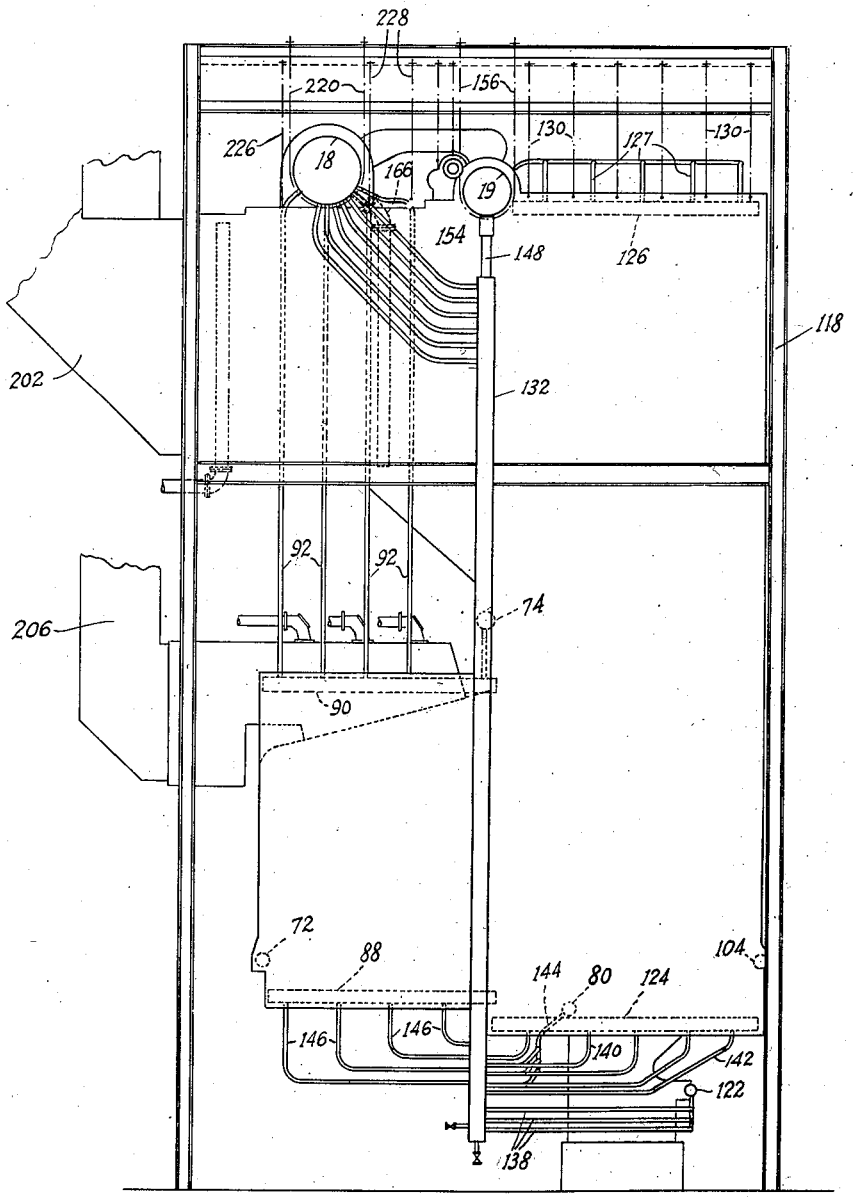

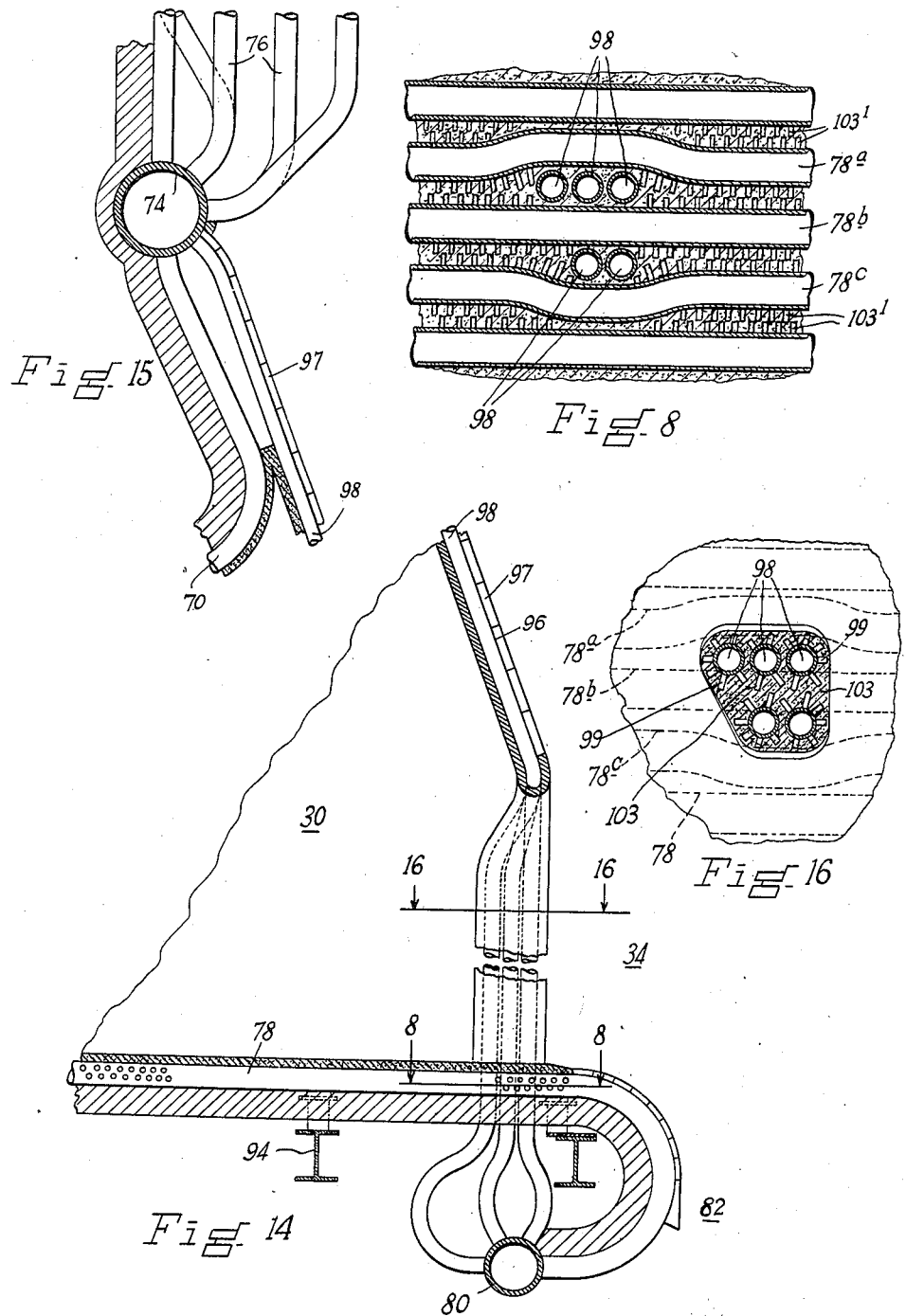

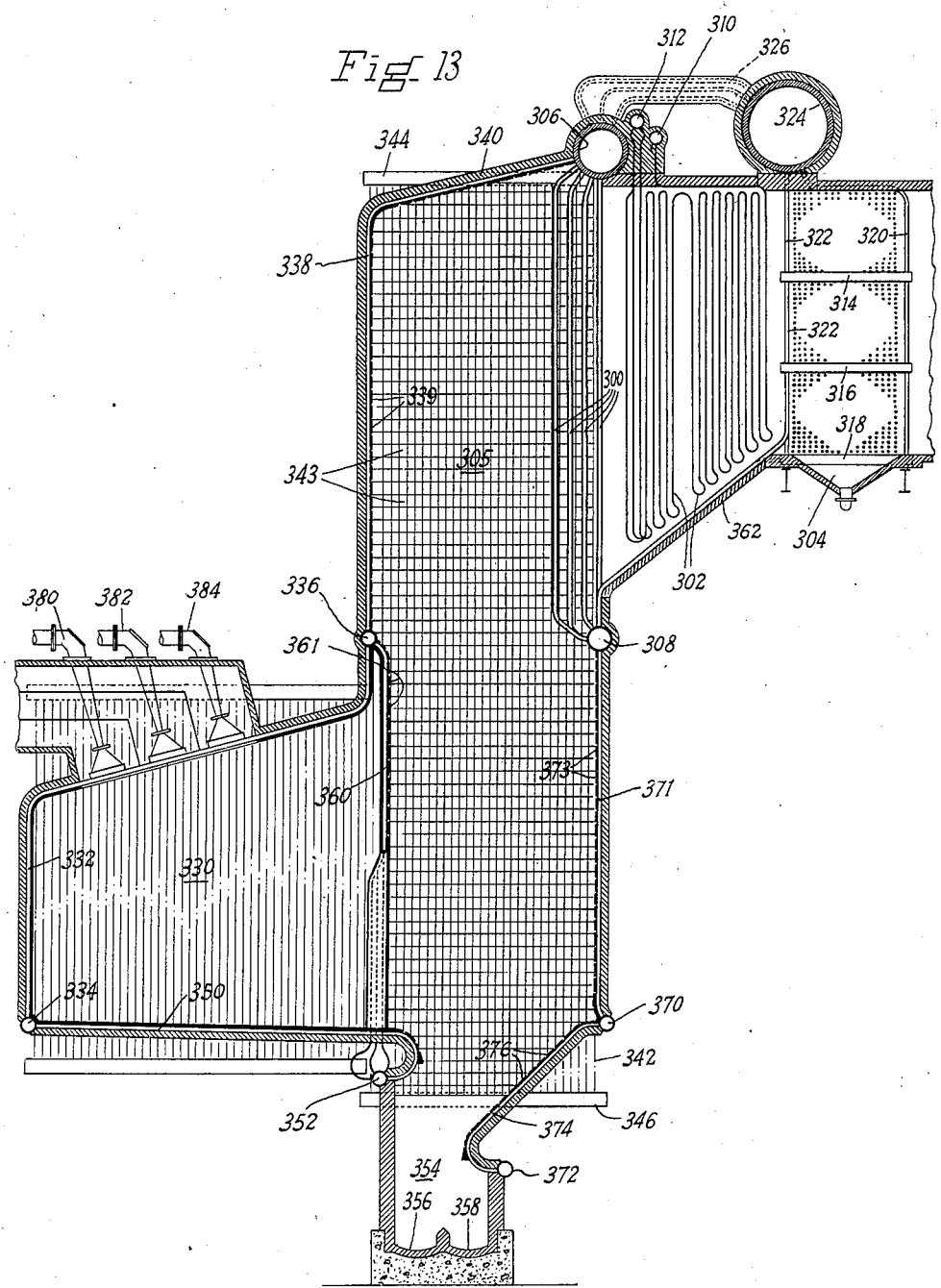

Patented Feb. 18, 1941

2,231,872

UNITED STATES PATENT OFFICE 2,231,872

RADIANT BOILER

Ervin G. Bailey, Easton, Pa., Thomas C. Toomey, West New Brighton, Staten Island, N. Y., and Rolfe Shellenberger, Westfield, N. J., assignors to The Babcock & Wilcox Company, Newark, N. J., a corporation of New Jersey Application April 16, 1937, Serial No. 137,196

17 Claims. (Cl. 122—336)

This invention is concerned with a radiant boiler involving a coordination of fuel burning and heat exchange apparatus capable of high rates of heat liberation and high rates of radiant heat absorption at large temperature differentials between the heat transmitting products of combustion and the heat absorbing media.

An object of the invention is a two-stage radiant boiler capable of producing economically high pressure, high temperature steam in large quantities for the ultimate production of power, characterized by the ability to burn a variety of fuels in suspension while efficiently absorbing the heat from the products of combustion and effecting the separation of the major portion of the non-combustible residues of the fuel in such a manner that continuity of operation and thermal efficiency may be maintained over long periods of time.

Another object is a steam generating installation having a furnace in which the characteristics of the fuel and the requirements of operation do not impose limitations one upon the other, and which materially extends the range of fuels that can be used while meeting the exacting requirements for satisfactory operation without the formation of deleterious slag formations on the steam generating surface. To accomplish these results the primary furnace stage, or combustion zone, of this two-stage radiant boiler is maintained during operation at a temperature sufficiently high to permit the successful use of the widest range of fuels, as, for example referring to coils, including bituminous coals of almost any volatile, ash or sulphur content, or fusing temperature of ash. This primary furnace stage is maintained hot enough to insure the efficient and stabilized combustion of these fuels, with minimum carbon loss over wide ranges of load variation. The primary furnace stage also facilitates the removal of ash in the molten state as slag, which method of ash elimination is not only compatible with the highest combustion efficiency, but furthermore results in the least amount of ash being carried away from the primary furnace stage in the gases resulting from the combustion of the fuel. The secondary furnace stage is so constructed and arranged as to expose the necessary heat absorbing surface to the gases to result in the temperature of the gases and suspended non-gaseous particles being reduced to that required at the exit of the secondary furnace stage for minimum fouling of surface due to slag accumulations, this exit also being shielded from the radiant heat of the high temperature primary stage.

An additional object of the invention is a radiant boiler of natural circulation type wherein the flow of the working fluid is accomplished by differential densities in the different parts of the circuit, while at the same time maintaining all heat absorbing portions of the circuit at exceedingly high rates of heat transfer, by providing an effective and stable downflow portion of the circuit in a position not subject to intense heat of the products of combustion.

Other objects of the invention will appear as the description proceeds, the description referring to accompanying drawings which indicate preferred installations in which the invention is embodied.

In the drawings:

Fig. 3 is a view mainly in the nature of a vertical section particularly showing the division wall separating the primary from the secondary furnace stages, and showing the primary furnace stage gas outlets which are formed by wall tubes spaced apart at the lower part of the installation.

Fig. 4 is a view in the nature of a partial vertical section through the second furnace stage and the drums of the illustrative system. This view indicates particularly the manner in which the fluid containing and heat absorbing parts of the system are suspended by hangers along, or closely adjacent to, a common datum level in order that objectionable stresses resulting from differential expansions and contractions of different parts of the system may be avoided.

Fig. 5 is a view in the nature of a vertical section illustrating another embodiment of the invention. In this embodiment of the invention only a single drum is used, and a greater amount of superheater surface is employed. The arrangement of the division wall between the primary and secondary furnace stages is somewhat different from that of the previously mentioned embodiment, for a purpose later to be described, and the primary stage furnace chamber, or high temperature furnace section, is provided with burners along an upright wall, as well as along its roof.

Fig. 6 is a view in the nature of a horizontal section taken through the superheater and the economizer of the Fig. 5 embodiment.

Figure 1:
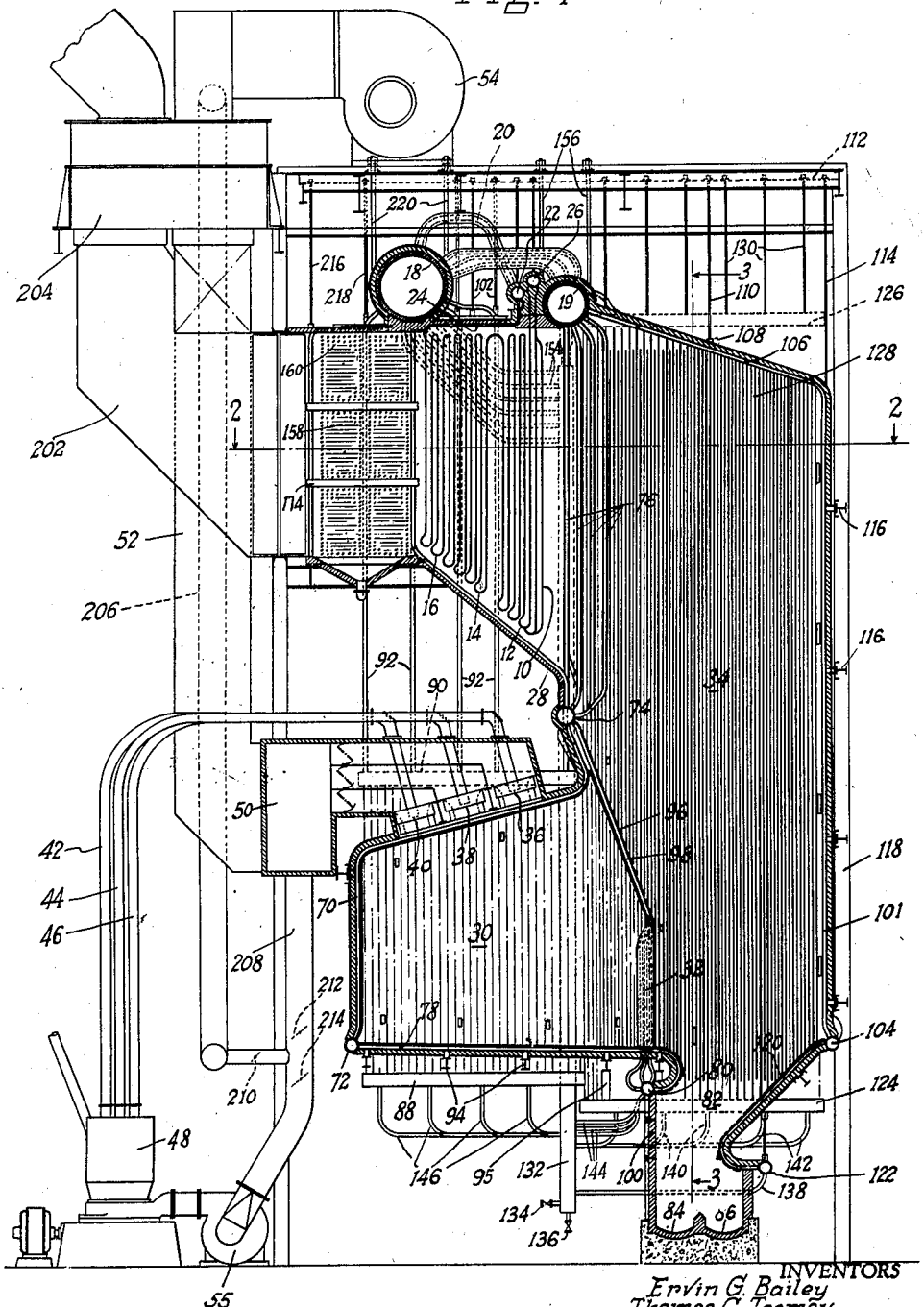
Fig. 1 is a view in the nature of a vertical section of one embodiment of the invention.

Fig. 7 is a view in the nature of a side elevation of the installation indicated in Fig. 1 of the drawings. This view particularly shows the relationship of one of the downcomers to the drums and the furnace wall tubes.

Fig. 8 is a partial section indicating the stud tube construction of the floor of the primary furnace stage. This view also indicates the relationship of the upright division wall tubes to the floor tubes. This view is taken along a plane parallel to the surface of the floor.

Figure 9:
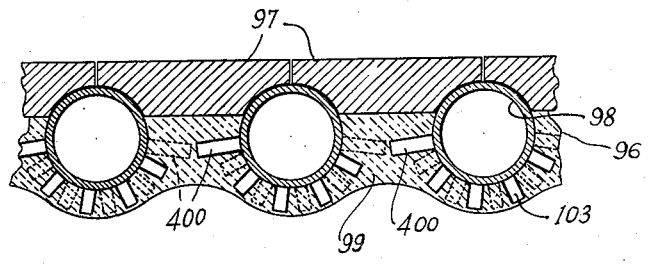

Fig. 9 is a view in the nature of a horizontal section showing a preferred type of construction for the division wall.

Figure 10:
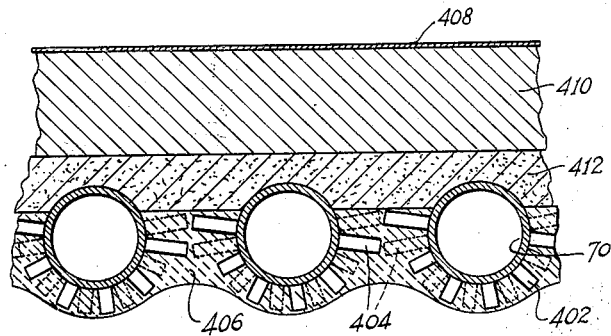

Fig. 10 is a partial view in the nature of a horizontal section indicating a preferred type of construction for the front and side walls of the primary furnace stage.

Figure 11:
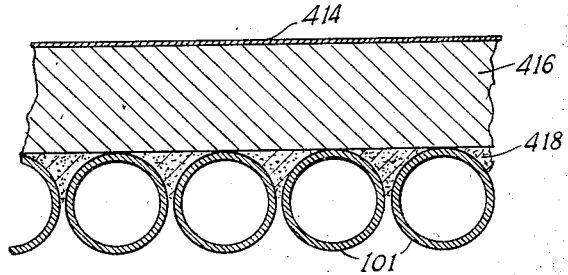

Fig. 11 is a partial horizontal section indicating one type of construction for the rear and side walls of the secondary furnace stage. In this construction the wall tubes present bare metallic surfaces directly exposed to heat of the furnace gases with solids in suspension.

Figure 12:
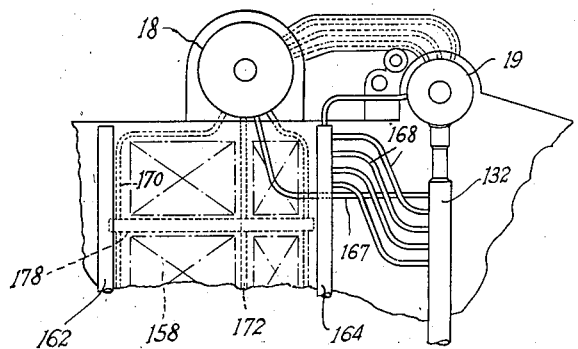

Fig. 12 is a detailed view of a modified part of the Fig. 1 system, showing parts in side elevation near the boiler drums. This view shows the economizer outlet header communicating directly with the downcomers by circulators which extend from the headers to the downcomers.

Fig. 13 is a view in the nature of a vertical section showing a modified form of the illustrative system. In this embodiment the convection stage of the system is arranged at the opposite side of the secondary furnace stage.

Fig. 14 is a partial view showing, in vertical section, the arrangement of furnace floor and its floor tubes to the division wall tubes which are connected to the same header at one side of the hopper.

Fig. 15 is a detail view showing, in vertical section, the arrangement and relationship of the furnace tubes which communicate with an upper primary furnace stage header.

Fig. 16 is a horizontal section taken on the line 16—16 of Fig. 14, showing in detail a relationship of the division wall tubes to the floor tubes.

The invention contemplates a two-stage radiant boiler wherein combustion and heat absorption for the vaporization of the working fluid will be developed in stages, each involving such coordination of furnace conditions and arrangement of heat absorbing surface that the final desideratum of slag free gases of proper temperature at the exit from the furnace will be attained. To this end the primary and major combustion of the fuel is effected in a zone of exceedingly high temperature wherein the ash constituents of the fuel are fused and caused to coalesce, while at the same time radiantly transmitting heat to the furnace wall, and in the second stage, the products of combustion are subjected to a temperature reduction by radiant transfer of their heat to surfaces of high absorptivity, so that the gaseous portions as well as the non-gaseous or molten residues will be reduced in temperature so that the gases will be at the proper temperature for contact with the subsequent superheating surface and the residues will be chilled and congealed to an extent preventing their deleterious deposit on the superheating surface and permitting their discharge from the bottom of the second stage of the furnace.

A preferred embodiment includes steam generating wall tubes defining the two-stage radiant boiler. All of these wall tubes absorb radiant heat resulting from the combustion of the fuel utilized, but in order to accomplish the results desired by the use of this construction the specific arrangement and character of the heat absorbing surfaces in the primary furnace stage and secondary furnace stage are different. This is true of each of the embodiments of the invention shown in Figs. 1, 5, and 13 of the drawings.

A result to be accomplished is to obtain and maintain high furnace temperatures in the primary furnace stage in order to accomplish rapid and complete combustion of the fuel, as well as the further result of maintaining the ash released during combustion from an ash bearing fuel, such as pulverized coal, in the molten condition as a slag that can be removed from the primary furnace stage, either continuously or intermittently as might be desired, while still in the molten condition.

In the secondary furnace stage the object is to present cooling surface of a higher rate of heat absorptivity in order to absorb the radiant heat from the gases and any non-gaseous particles that might be in suspension in the gases, and so reduce their temperatures, particularly that of the non-gaseous particles in suspension, so that when they contact the convection heating surface subsequent to the secondary furnace stage, which in this construction is the superheater, the non-gaseous particles will be at a temperature below their fusion temperature and will consequently be in a dry or non-sticky condition and will not result in the accumulation of molten slag over the convection surface.

Because of the difference between solid and gaseous radiation, the temperature of the non-gaseous particles in the gases can be lower than that of the gases themselves. This knowledge is utilized by so providing for absorption surface in the secondary furnace stage as to insure the temperature of the non-gaseous particles as being below their fusion temperature when leaving this stage of the furnace, while at the same time the temperature of the gases will be such as to insure the production of high temperature steam by contacting with the convection bank of superheater tubes. Convection heat transfer rates are greater the closer the spacing between tubes of the convection bank, and as it is possible to utilize such closely spaced tubes in the convection bank only if such non-gaseous particles as are in suspension in the gases are in a non-adhesive condition, our invention permits this desired tube spacing of superheater tubes. Should the non-gaseous particles in the gases be above their fusion temperature, and thus be in the form of sticky particles of slag, upon contacting the tubes of the superheater convection bank they would accumulate on the tubes and form undesirable obstructions to gas flow, with the result that heat absorption, as well as the overall operating conditions, would be inefficient. This condition is avoided by this invention.

This object is further enhanced by the arrangement of the division wall between the primary and secondary furnace stages; this wall is so arranged as to shield the outlet of the secondary furnace stage from radiation and re-radiation from the high temperature primary furnace stage.

The above enumerated objects are accomplished in an embodiment of this invention which includes an arrangement of steam generating wall tubes defining the primary and secondary furnace stages. In the Fig. 1 of the drawings the primary furnace stage is indicated at 30 and the secondary stage at 34. In the primary furnace stage in which the high rates of combustion and high temperatures prevail, the walls are preferably lined with a ceramic refractory material, bonded to the tubes so that it is maintained thereon as an integral part of the walls, even though its furnace face layer is maintained continuously at a high temperature during operation of the unit. The walls of the secondary furnace stage present high heat absorbing surfaces to the furnace gases, either in the form of a "tube to tube" arrangement of the steam generating wall tubes defining the boundaries of the furnace stage being bare with their surfaces essentially contacting in the plane of the boundary, or in the form of a "partial stud tube" arrangement in which the steam generating wall tubes are spaced apart, but the spaces between adjacent tubes of the wall in the plane of the boundary being closed against passage of gases by studs or extensions projecting therefrom and being bonded with a refractory material to provide a gas-tight wall, or by imperforate metal extensions from the tubes in the plane of the boundary with the furnace surfaces of the tubes being bare and exposed to the furnace gases, or in the form of tubes spaced apart and having metallic blocks held in contact therewith and forming a gas-tight wall, or such other construction and arrangement that will result in the exposure of highly heat absorbing surface to the furnace gases. Furthermore, in order to facilitate the removal of ash or molten slag that might be deposited and accumulated on the walls of this secondary furnace stage, the wall construction employed, and as described, has not only high heat absorbing capacity, but is of such construction as to provide a natural cleavage plane between the wall surface and slag accumulations, that will result in the slag naturally breaking away from the wall after it has accumulated to a point where its weight is greater than that which can normally be maintained in view of the natural cleavage plane provided by the surface of the wall itself.

In the primary furnace stage, combustion is maintained at high rates. Furnace gas temperatures run as high as 3000 degrees F. The burners are supplied with air preheated to a high temperature, and the furnace parts, including the burners, are so arranged that adequate turbulence results in the thorough mixing of the preheated air and the fuel, which condition is desirable for the rapid and complete combustion of the fuel.

When pulverized coal is used as a fuel in the primary stage, the ash which is present to a greater or lesser degree in all coals is, due to the high temperatures prevailing in this stage, in molten form. A substantial portion of this slag is deposited on the floor of the primary furnace stage and is maintained in this molten or liquid condition so that its removal is facilitated either by permitting it to run out continuously, or by tapping it intermittently, as particular circumstances might dictate. In one illustrative embodiment the burners are so arranged as to keep this slag flowing to a hopper, or slag discharge pit.

Not all of the slag formed in the primary stage is deposited on the furnace floor. Some passes to the secondary stage as particles in suspension in the gases. As they move through this stage, heat is radiated from these particles and from the gases to the heat absorbing surfaces of the second stage. This heat transfer results in such a lowering of the temperatures of the gases and particles in suspension that the particles are in a dry solid form before they contact with the tubes of the heating surface beyond the second stage. This situation is further assisted in that due to the differences between solid and gaseous radiation, the greater radiation from the solid particles results in their being at a somewhat lower temperature than the surrounding gases, which is of advantage in so far as any tube fouling due to slagging is concerned.

It has been suggested that such accumulations of slag upon the superheater surface could be prevented by the provision of a deep bank of tubes affording a large amount of convection heating surface between the furnace and the superheater, but this suggestion does not serve the purpose of the present invention for several reasons. In the first place, there would be excessive cooling of the furnace gases before they reach the superheater. This would increase very materially the difficulties in obtaining the high degree of superheat desired, and would necessitate the use of an excessive amount of heating surface in the superheater to attain the superheat required because of the reduced temperature differential. In the second place, there would result large accumulations of slag upon the interposed tubes. These difficulties are overcome by the present invention in a high pressure high temperature steam generating and superheating unit arranged so that a limited amount of steam generating surface is highly effective in cooling the slag particles before they reach the closely spaced tubes of the high temperature superheater, and by concurrently reducing the furnace gas temperature to the proper point for effective utilization in the superheater.

The invention contemplates primarily a steam boiler operating at pressures within the range of 1000 to 1500 pounds per square inch and even as high as 2500 pounds per square inch. Considering the steam pressure to be approximately 2500 pounds per square inch, the temperature of the saturated steam is, approximately, 668 degrees F., and when the total temperature of the steam supplied by the superheater is of the order of 950 degrees F., approximately 350 B. t. u.'s per pound have been absorbed by each pound of steam supplied. The latent heat of evaporation of water at this pressure is 353 B. t. u.'s per pound. Thus, the energy absorbed as superheat in the steam represents a high proportion of the total energy absorbed, and this situation is to be contrasted with the results obtained from a boiler operating at 600 pounds pressure (saturated temperature 486 degrees F.) with a total steam temperature of 725 degrees F. In the latter case each pound of steam at a total temperature of 725 degrees F. has absorbed approximately 163 B. t. u.'s per pound in superheat, while the latent heat of evaporation is 750 B. t. u.'s per pound. Thus the 2500 pound unit has 50 per cent of the total available heat absorbed in the generation and superheating of the steam from water at saturation temperature in the form of sensible heat of superheat, whereas the 600 pound unit has only 18 per cent. Such a high percentage of the total heat in the superheated steam is absorbed by the superheater of the steam boiler of this invention that the remainder of the heat absorbed in the generation of the steam can be readily accomplished in the furnace wall tubes without the necessity of having a conventional natural circulation bank of boiler tubes. The boiler, therefore, may be said to be a bankless boiler, or in other words, a boiler in which there is no conventional natural circulation bank of boiler tubes.

Furthermore, in so far as the absence of a conventional natural circulation bank of boiler tubes is concerned, in the present high pressure installation the temperature of the gases leaving the superheater is so low with respect to the saturated temperature of the steam corresponding to the pressure involved that there would not be sufficient temperature differential to result in the generation of any appreciable amount of steam in an additional bank of steam generating tubes beyond the superheater. In addition, at the high pressures involved in the practice of this invention there would be a further difficulty in the operation of any natural circulation bank of steam generating tubes beyond the superheater arising from the relation of the steam and water densities at the high pressures involved, these densities approaching each other and, when considered with the application of heat to those tubes of the bank which would normally act as downcomers, resulting in some generation of steam and thereby bringing the respective densities of steam and water mixtures in downcomers and risers still closer together, would minimize materially the natural circulation effect in such a tube bank.

In the operation of the radiant boiler of the present invention it is an object to have as much as possible of the suspended solids separated from the gases, but those solids which do reach the superheater have their temperatures reduced to the point where the presence of the solids will not interfere with the operation of the superheater.

The superheater 10 indicated in Fig. 1 of the drawings is a pendant superheater involving long small bore tubes in the form of coils. These coils may be said to consist of a number of successive sections 12, 14, and 16. Each coil has each of its upper return bends pendantly supported while the remaining parts of the coil are free to move under expansions and contractions caused by the high temperature differentials between successive return bend tubes. The tubes at the economizer side of the superheater of the Fig. 1 installation are the inlet tubes and they are subjected to furnace gas temperatures and steam temperatures which are several hundred degrees lower than the corresponding temperatures to which the tubes at the opposite ends of the coils are subjected.

The superheater receives steam from a drum 18 which may act as a steam and water separator. Steam passes from this drum through the superheater supply tubes 20 to the superheater inlet header 22. Thence, the steam passes through the roof tubes 24 forming parts of the superheater coils. From the roof tubes the steam passes recurrently through the coils to the superheater outlet header 26 from which superheated steam is conducted to a point of use.

As particularly indicated in Fig. 4 of the drawings, the upper return bends of the superheater loops 12, 14, and 16 are preferably welded to the horizontally extending superheater tube sections herein referred to as the roof tubes 24. At the upper sides of the roof tubes there are hanger lugs 9, 11, 13, and 15, preferably welded to the roof tubes. These lugs co-operate with hangers to suspend the superheater coils in a manner which will receive further reference. The roof tubes, or horizontal sections 24 of the superheater coils, receive steam at saturated temperature, and this causes their metal temperatures and the temperatures of the associated hanger lugs to be maintained at values much lower than would be the case if the hanger lugs were welded directly to the superheater loops. These lower metal temperatures also result from the fact that the furnace gases contacting the loops 12 are of higher temperature than the gases contacting the loops 16 and the major portions of the roof tubes 24.

This superheater construction also serves to maintain the coils as separate units, as well as to suspend the component loops in such a way that they may have the desired freedom of expansion and contraction under different temperature conditions. The roof tubes 24 are also preferably in contact with the insulating material at the top of the boiler casing, as indicated in Figs. 1 and 5 of the drawings, in order that this material may be protected against overheating.

The illustrative superheater effectively employs the principle of counter-flow heat exchange, the furnace gases flowing toward the left in the Fig. 1 installation while the steam within the tubes is increased in temperature as it flows, generally, toward the right. The lower wall 28 of the gas pass inclines downwardly toward the gas inlet of the superheater, and the gases flowing across the superheater tubes are thus caused to have increasingly smaller flow areas as their temperatures decrease. Another advantage of this particular gas pass construction is that the inclined superheater wall 28 facilitates the removal of dust particles and other solids which may be separated from the gases as they pass over the superheater tubes.

From the chamber 30 the furnace gases flow through outlets 32 at temperatures too high for safe contact with the superheater. When pulverized coal is used for fuel these gases are also at temperatures above the fusion temperatures of the ash content of the fuel. Either circumstance necessitates a cooling of the gases before they reach the superheater, and, in the illustrative unit, the gases are cooled in the secondary furnace stage 34. The heat absorbing surfaces presented to the furnace gases in this chamber are provided by cooled metallic surfaces illustrated as closely spaced wall tubes connected into fluid circulation, but metallic blocks having smooth wall surfaces might also be provided. Such blocks present smooth wall surfaces which act as cleavage planes to prevent excessive accumulations of slag.

High furnace temperatures in the primary furnace stage 30 may be attained through the operation of combination fuel burners 36, 38, and 40. These burners may be simultaneously or independently operated with different fuels such as pulverized coal, oil, or gas. They are shown as supplied with primary air and pulverized coal through ducts 42, 44, and 46, leading from the pulverizer 48, and with preheated secondary air from a wind-box 50 connected by the duct 52 with a blower 54. Suitable liquid and gaseous fuel connections may be also provided for each burner.

The walls of the chamber 30 are preferably of a type shown and described in the pending application No. 39,010, filed on June 23, 1925, to cover inventions made in furnaces by E. G. Bailey. The walls are defined by spaced tubes connected into the boiler circulation. On their furnace sides these tubes are provided with metallic studs welded to the tubes and arranged as shown in Fig. 10 of the drawings. These studs, because of their thermal conductivity and their bonding characteristics, act to maintain the ceramic refractory lining of the furnace. The lining is provided by refractory material installed in a moldable condition and tamped over the tubes and between the studs. Along the sides of the tubes opposite the refractory lining the tubes are covered with heat insulating material suitably tied to the tubes and held in place by a sectional metallic casing.

In the installation illustrated in Fig. 1 of the drawings, the primary furnace stage 30 has its front wall and its roof defined by the tubes 70 connected at their lower ends to the header 72. They discharge steam and water into the upper header 74 which is connected to, and may be supported by, widely spaced screen tubes 76. The latter extend across the path of the furnace gases at a position forwardly of the superheater 10 and are connected to the rear steam and water drum 19 at their upper ends. Arranged vertically as they are shown, they advantageously act as tension supports for the header 74 and its associated tubes.

The floor of the primary furnace stage 30 is defined by floor tubes 78 connected at corresponding ends to the above mentioned header 72. Their opposite ends communicate with the lower header 80 so as to receive water therefrom by means of connections which will be later described. The floor of the furnace may be of the same refractory and stud tube construction as that above referred to, or, alternatively, the floor tubes may have metallic blocks bonded thereto in good thermal relationship to form the floor surface.

The floor of the primary stage 30 preferably has a continuous slope or inclination downwardly toward an ash pit, or hopper, 82 and past the furnace gas outlets 32. With this construction, and under the high temperatures involved in the operation of the unit, molten slag deposited on the furnace floor as a result of pulverized fuel operation will be maintained in such a state that it flows toward the hopper 82. The latter may be provided with sluiceways 84 and 86 which may effect a continuous or periodic disposal of slag and other solids separated from the furnace gases, through the operation of a stream of water.

The side wall tubes 89 of the primary stage 30 are connected at their lower ends to headers 88 and at their upper ends to similar headers 90. For purposes which will receive subsequent reference these side walls are supported by riser tubes 92 which are suspended from the boiler setting framework near the top of the installation. Preferably, also, the chamber 30 is supported by these side walls, its floor being partially supported upon beams 94 which in turn receive their support from the lower side wall headers 88. Similar beams 95 supporting the floor from other side walls will receive reference in the following description.

In the illustrative installation the primary furnace stage 30 is separated from the second furnace stage 34 by a division wall 96 defined by wall tubes 98 inclined downwardly from the header 74 to which the screen tubes 76 are connected. The upper portions of these tubes are preferably in single row alignment, but at some position intermediate their lengths some of the tubes are bent out of this wall alignment and are arranged to define side walls of the furnace gas outlets 32. These tubes are, on their sides toward the primary stage 30 and above the outlets 32, preferably provided with such a stud tube and refractory construction as that previously described. On the opposite side of this wall the tubes are preferably provided with metallic blocks. Rapid absorption of heat in the secondary stage 34 is promoted by the use of Bailey blocks which present bare metallic surfaces to the furnace gases.

A preferred construction of the division wall 96 is particularly shown in Figures 9 and 14 of the drawings. In the latter figure the wall tubes 98 are shown as extended through the furnace floor with their lower ends communicating with the header 80. Steam is generated in these tubes at high rates due to the high furnace temperatures, to the use of the metallic wall blocks 97, and to the fact that the wall 96 is exposed on both sides to the heat of high temperature furnace gases, and the tubes must be adequately supplied with water to prevent damage to the wall defined by the tubes.

The tubes 98 are supplied with water from the header 80, and the latter also serves to similarly supply the floor tubes 78 and the wall and roof tubes 70. The latter define furnace faces of greater area and subject to equally high temperatures, and they are therefore subject to greater heat absorption. They also serve to cool and maintain a much greater area of ceramic refractory furnace lining. It is therefore important that these tubes have an adequate water supply, and that they be not robbed by the tubes 98. One influence which would tend to cause such undesired action (other conditions being equal) resides in the combined length of the tubes 78 and 70 as compared to the length of the tubes 98. With uniform tube diameter the consequent lower frictional resistance of the tubes 98 would cause increased flow therethrough and a correspondingly decreased flow from the header 80 through the tubes 78 and 70. Compensatory provisions are therefore necessary, and this is taken care of in the present instance by making the floor tubes 78 of larger diameter than the tubes 98. This is indicated in Figure 14. Increased flow area for the floor tube circuits is thereby provided to substantially equalize the frictional resistance through the two flow paths in parallel.

Figure 14 appears to show three tubes 98, and only one of the tubes 78, communicating with the header 80, but it is to be appreciated that the tubes 98 are grouped as indicated in Fig. 16 to provide gas outlets for the combustion chamber. Also, Fig. 14 is a vertical section through one of those outlets. The floor tubes 78 are not similarly grouped.

The five tubes 98 grouped as indicated in Fig. 16 are provided with the metallic extensions 99 for bonding and maintaining the ceramic refractory material 103 which encloses all of these tubes, as shown. Three of the tubes 98 are in line between two floor tubes 78a and 78b, while the remaining two are in line between the floor tubes 78b and 78c. The latter are provided with the refractory maintaining studs 103'.

An alternative construction for the side of the wall defined by the tubes 96 facing the secondary furnace stage 34 is that the tubes may have metallic extensions to present the bare metal surfaces to the heat of the furnace gases. The extensions referred to substantially close the spaces between the tubes.

The fluid cooled side walls of the gas outlets 32 act as a slag screen, causing gas mixing to promote combustion of any combustibles that might remain unburned in the gases at this point and furthermore effecting some separation of slag particles by adhesion thereto. Upon discharge from the primary furnace stage, the furnace gases turn upwardly into the secondary furnace stage. Such of the slag that might adhere to the wall surface of this secondary furnace stage will normally fall therefrom upon any material amount accumulating. This action takes place by virtue of the cleavage plane previously described and also by the use of any slag removal means that might be employed, and as this surface is located above the hopper the removed slag accumulations will drop into it and be subject to continuous or periodic removal.

The wall tubes 101 extend along the right hand side of the secondary furnace stage 34, and have upwardly inclined extensions 106 defining the roof of this stage 34. They extend to, and communicate with the drum 19. Exteriorly of these tubes there is a layer of heat insulating material 416 held against the tubes by any appropriate tying means. This insulating material also extends over the roof of the furnace chamber and the roof, as well as the walls, include metallic sheathing 414 preferably provided by sheet metal sections. Such construction is indicated in Fig. 11. Intermediate the ends of the roof sections 106 of the furnace chamber wall tubes 101 there are hanger lugs 108 welded thereto. The roof is supported by means of hangers 110 connected to these lugs at their lower ends and suspended at their upper ends from the beam 112. Similarly, the furnace chamber wall tubes, at the ends of their upright wall portions are held in position by hangers 114 secured to the tubes and to the beam 112.

Along the right hand side of the furnace chamber 34, the wall tubes 101 are held in alignment by guides which preferably take the form of horizontal beams 116. These beams may be fixed to the columns 118 and have a slidable relation to the wall tubes in order that the latter may be held in wall forming alignment and still be free to expand upwardly and downwardly under the different temperature conditions which obtain while the unit is in operation. Conversely, the beams 116 may be guided vertically in guideways provided on the columns 118 while the beams are fixed with reference to the wall tubes 101.

The wall tube header 104 at the top of the hopper and at the right hand side of the secondary furnace chamber has the inclined hopper cooling tubes 120 connected thereto. These tubes are preferably covered on their furnace sides with metal wall blocks so as to present an ash cooling and receiving surface which guides solid particles to the sluiceways 84 and 86. These hopper tubes are also preferably bent outwardly at their lower ends and connected to the header 122 which, in turn, is connected with the boiler circulation in a manner to be later described.

The header 122 is preferably suspended from lower cross headers 124 of the furnace chamber side walls. Above each header 124 is a header 126 arranged at the top of the chamber. Closely spaced wall tubes 128 connect these headers. These wall tubes form a "tube to tube" wall similar to the above described right hand wall of the furnace chamber. They act as hangers to take the load of the lower cross header 124, and are in turn, suspended by means of hangers 130 connected at their upper ends to the beam 112 of the boiler setting framework.

In order that the above described parts may have an adequate supply of water so that they may all act as risers, large diameter downcomers 132 are arranged at the ends of the drum 19, and below the latter. When the drum 19 is of a 36 inch diameter each downcomer 132 may have a diameter of the order of 14 inches. Being of such large diameter, the downcomers are capable of supplying a large volume of water to the lower ends of the furnace wall tubes without excessive frictional resistance.

The bottom of each downcomer 132 is located at a position below all of the remaining pressure parts of the installation, and drain connections 134 and 136 are installed at the lower ends of the downcomers. The downcomers are provided with conduits 138 of sufficient number and sufficiently large diameter to provide adequate circulation connections for the header 122, the tubes 120 of the hopper wall, and the tubes 101 of the right hand wall of the secondary furnace stage 34. Above these connections the downcomers communicate with the side wall cross headers 124 by means of a number of similar connections 140 and 142. The header 80 connected to the furnace floor tubes similarly receives an adequate supply of water from the downcomers through the conduits 144. The lower side wall headers of the primary stage are connected with the downcomers 132 by a plurality of tubes 146. All of the circulation is taken care of by a minimum number of large diameter downcomers.

To withstand high fluid pressures and temperatures, the drum 19 has thick steel walls. It may be forged from a single ingot by a piercing process, or, alternatively, it may be manufactured by welding together curved steel sections. In any event, the ends of the drum are arranged so as to project beyond the sides of the furnace 34, and they are of increased thickness in order to provide adequate strength for the securement thereto of the large diameter downcomer drum connections 148. Desirably, the main body of each downcomer may be fabricated with an inside diameter such that it may have a telescoping fit with reference to the outside diameter of the lower portion of a downcomer connection to the drum. This provides an erection factor of considerable flexibility.

At the upper end of each downcomer there are circulators 154 connecting the downcomer with the water space of the steam and water drum 18. In combination with the downcomer connection 148 these circulators connected to the drum 18 provide for an adequate supply of circulating water so that all of the wall tubes may act as risers, the screen tubes 76 connecting the upper primary furnace stage header with the drum 19 acting as water wall risers for the furnace walls.

The downcomers depend from the drum 19 and the entire load imposed by the drum and the downcomers is suspended by tension supports in the form of straps 156 extending around the ends of the drum and secured at their upper ends to the beam 112 of the boiler framework, as clearly shown in Fig. 4 of the drawings.

Beyond the superheater the counter-flow principle of heat exchange is carried forth by an economizer 158. This apparatus preferably consists of return bend tubes connected at their ends to form flat coils 160. The coils are preferably disposed horizontally in the direction of gas flow. The inlet end of each coil is disposed at the side of the economizer remote from the superheater and it is connected at that position to a vertically disposed inlet header 162. The economizer may thus be said to be of the type having a stack of horizontally disposed flat coils disposed one above the other.

At the outlet of the economizer, or at the side of the economizer adjacent the superheater, the outlet ends of the economizer coils are connected to a vertically disposed outlet header 164 from which a connection 166 communicates with the water space of the steam and water drum 18.

As an alternative to the above mentioned arrangement of outlets for the economizer coils the economizer outlet header may have a plurality of circulators 168 (see Fig. 12) directly connected to the top of one of the downcomers 132. This construction would replace most of the circulators 154 which have been previously described as connecting the tops of a downcomer with the water space of the steam and water separator drum 18. One, or more, however, of the latter circulators may ge retained when the circulators 168 are employed.

The economizer has upright supporting tubes 170 and 172. These tubes are preferably connected at their upper ends to the water space of the steam and water separator 18. At the lower ends of the tubes of one of these sets there are extensions which are positioned along the inclined floor 28 of the superheater gas pass. These extensions are continued to the base of the screen tubes 76 where they communicate with the screen header 74.

The tubes 170 and 172 are arranged vertically as shown, and they are preferably made in sections connected by the economizer cross headers 174, 176, and 178. These headers act as beam supports for the economizer coils 160, and when it is considered that the total weight of the economizer coils is in excess of 100 tons, it will be appreciated that these cross headers must have considerable strength as beams.

The number of the cross headers 174—178 may vary in accordance with the strength of the headers, and the number, and weight, of the economizer coils. As indicated in the drawings, there are three sets of cross headers dividing the total number of economizer coils into three groups. The arrangement of the coils in each group is such that they may be considered as constituting a "stack." In other words, they are placed flatwise, one upon the other.

Figure 2:
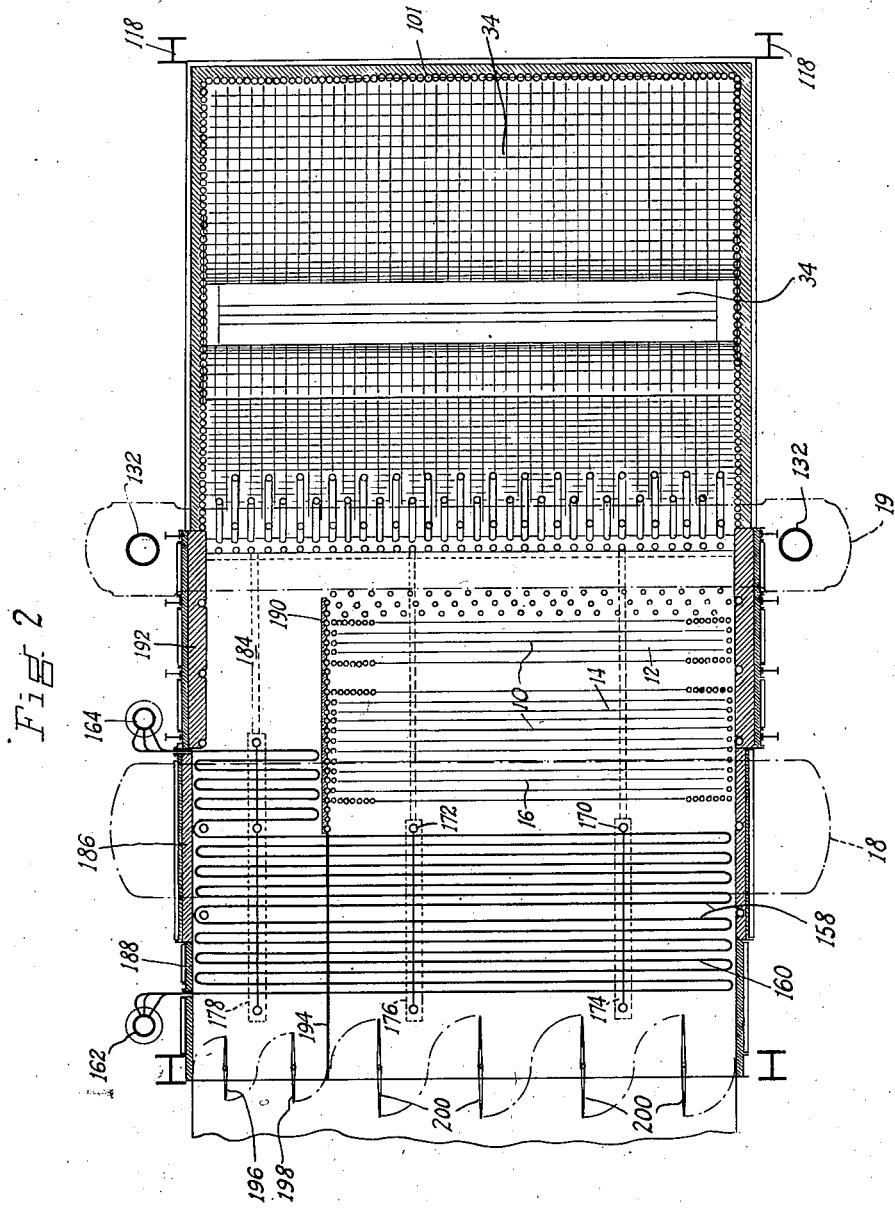
Fig. 2 is a view in the nature of a horizontal section of the Fig. 1 embodiment, taken on the section line 2—2 of Fig. 1.

It will be noted that Fig. 2 shows one of the vertically arranged economizer supporting tubes 170 and 172 connecting with the cross header 178 intermediate its ends, and this arrangement is to be considered merely illustrative of structures in which there may be several sets of these tubes intermediate the ends of the economizer cross headers.

The superheater is of the convection type, consisting of spaced tubes subjected to the flow of furnace gases, and, as such, does not provide a sufficiently uniform steam temperature over a wide range of gas flow. A controlled steam temperature or superheat is, therefore, provided by means of a gas by-pass around the superheater.

Referring to Fig. 2 of the drawings, such a bypass 184 is formed by the superheater wall 190 and the adjacent exterior casing wall 192 of the boiler setting. The economizer coils may be crossed by a plate baffle 194 which forms a continuation of the wall 190 across a part of the economizer heating surface.

The superheater by-pass wall 190 preferably consists of refractory elements secured to the tubes of one of the superheater coils.

At the outlet end of the by-pass 184, Fig. 2 indicates two dampers 196 and 198. Similar dampers 200 control the main gas flow over the superheater tubes and the major portion of the economizer heating surface. These dampers may be automatically operated in response to changes in steam flow or in response to changes in superheat from a desired value, or by other appropriate variables.

After passing across the heating surfaces of the economizer, the furnace gases pass through the breeching 202 to the gas inlet side of an airheater 204 which preheats the air utilized for combustion of the fuel. The air discharge side of this heater communicates with the duct 52 supplying secondary air for the windbox 50. The air heated at this position is supplied by the blower 54, above mentioned, and tempering air may be lead from the discharge side of the blower around the airheater by a tempering air bypass 206 communicating with the main primary air duct 208. The latter leads from the windbox 50 to the inlet side of the blower 55 which supplies the pulverizer 48 with primary air. Adequate control of primary air temperatures, for the purposes of fuel drying or adequate fuel supply, may be effected by the operation of the damper 210 in the tempering air by-pass and by the dampers 212 and 214 on the opposite sides of the position at which the tempering air duct communicates with the main primary air duct.

To eliminate the development of objectionable stresses and excessive loads the predominating portions of all of the fluid heat exchange surfaces of the installation, or substantially all of the elements providing the heating surfaces are preferably pendantly supported from the steel framework of the boiler setting at a common level. Arrangements of elements for this purpose are indicated in Figs. 1 and 4 of the drawings. This level is indicated by the common datum line AB (see Fig. 4) which is a horizontal line at drum level. The upper side wall headers 126 preferably extend substantially along this line as shown, and the pendant supports for the superheater coils are in alignment at the same position. The vertically arranged economizer supporting tubes have hangers 216 and 218 connected to those tubes at positions close to the common datum line AB. The steam and water separator 18 is also supported by straps 220 at a position near the datum line as shown in Fig 4, and the upper headers 90 for the combustion chamber side walls also have fluid cooled tubes extending vertically from those headers to positions near the datum line. These tubes 92 are connected directly to the bottom of the steam and water separator 18 or are connected near the datum line AB to hangers 226 and 228 secured at their upper ends to beams 112 from which all of the elements providing the fluid heat exchange surfaces are supported. This entire arrangement permits the fluid circulating parts of the installation to expand downwardly in like degree from a single level as the fluid temperatures of the system increase.

In this construction, with all expansible parts supported from a common datum line, relative expansion of such parts is eliminated, which avoids the necessity for providing seals for joints of relative movement.

It will be seen that the total vertical expansion of the sidewall tubes 89 plus the riser tubes 92, which act as hanger supports from the datum line position AB, will correspond to the vertical expansion of the combination of the wall tubes 98 and tubes 76. Similarly, the tubes of the second stage 101, which are subject to the same saturated steam and water temperature will expand correspondingly.

In high pressure units of the illustrative types, where the ratio of the density of the steam to the density of water is much nearer unity than is the case at lower operative pressures, the differential hydraulic head is thus reduced and the elimination of all unnecessary frictional resistance in the furnace wall tubes or in the furnace wall riser system is important.

The relation of the primary furnace stage 30 and the second stage 34 to the convection section and the other boiler components also results in compactness of the entire installation.

The embodiment of the invention illustrated in Fig. 5 of the drawings operates at a steam pressure of the order of 2500 pounds per square inch. At this pressure there is a much higher saturated steam temperature, and a much higher percentage of the total liberated heat is absorbed in the superheat. Because of this fact the second furnace stage chamber 230 may have a smaller percentage of its heat absorption surface formed by steam generating water wall tubes connected into the boiler circulation. Because of these circumstances, the radiantly heated tubes of at least one of the walls of the chamber 230 form a radiant superheater, or reheater. The headers 232 and 234 for these reheater wall tubes will then be connected to different stages of a steam turbine. Otherwise, the invention contemplates that the side walls, and, for that matter, the remaining walls of the furnace chamber 230 shall be similar to corresponding parts described with reference to the embodiment of the invention shown in Fig. 1 of the drawings.

The superheater of the Fig. 5 installation is much the same as the superheater of the Fig. 1 embodiment above described and the type of economizer employed is somewhat similar. The Fig. 5 embodiment is also intended to involve large diameter downcomers similar to those shown at 132 in the Fig. 1 embodiment, and the number of tube seats in the high pressure drum 236 may be reduced by connecting the water, or steam and water mixture, discharge tubes of the economizer directly to the upper ends of the downcomers.

The convection section of the Fig. 5 unit, similarly to the Fig. 1 embodiment, has a lower wall 239 inclined downwardly toward the header 238. Riser tubes 240 communicate with the header or drum 238 from which upright baffle tubes or division wall tubes 242 extend downwardly vertically toward the lower division wall header 244. They are connected therewith as shown. By reason of the arrangement of this baffle wall or division wall in a substantially vertical position, suspended solids separated from the furnace gases in the superheating zone and in the screen zone defined by the upright screen tubes 246 may more readily fall into the hopper 248.

The division wall tubes 242 are preferably covered upon their opposite sides by such materials as those mentioned in the description of the corresponding wall of the Fig. 1 embodiment. They also form transversely arranged side walls of gas outlets 250 for the furnace stage 252. The tubes of these walls are in alignment in rows parallel with the furnace floor tubes 254 so that they may be vertically extended between the floor tubes for connection to the lower floor tube header 244.

The remaining walls of the primary furnace stage 252 are constructed in a manner similar to the manner of construction of the corresponding parts of the Fig. 1 embodiment, and the tubes of stage 252 are preferably similarly supported. The Fig. 5 embodiment does, however, include an arrangement of burners whereby the flow of the slag on the furnace floor is maintained. The furnace is provided with the down-shot burners 256 and 258 supplied with fuel and air after the manner of the burners of the Fig. 1 embodiment. Dampers 257 and 259, corresponding to dampers which may be included in the Fig. 1 unit, independently control the supply of secondary air to these burners. Additionally, however, the primary furnace stage 252 is provided with the horizontally directed burner 260 which causes flames to be directed against the slag on the furnace floor, and toward the furnace gas outlets 250. This arrangement of elements prevents the accumulation of a slag layer of any great thickness upon the furnace floor and promotes the steady flow and continuous discharge of slag.

The combination of the down-shot burners 256 and 258 and the horizontally directed burner 260 also promotes a high degree of turbulence and thus insures more complete mixing of fuel and air. Better combustion conditions are thus attained and higher furnace temperatures maintained.

Fig. 6 of the drawings illustrates the 2500 pound unit in horizontal section. The superheater gas by-pass 231 is here shown, and the relation of the superheater tubes and economizer coils 233 thereto also illustrated. Gas flow through the by-pass and over the superheater may be controlled by dampers arranged similarly to those of the Fig. 1 unit.

The economizer inlet header is shown at 235 and the outlet header at 237, at the same side of the unit. Between these headers a single removable casing section 239' permits any individual economizer coil to be removed and replaced.

Fig. 9 of the drawings illustrates in transverse section a type of division wall to separate the primary and secondary furnace stages. The division wall tubes 98 have the short metallic studs 103 welded to their sides which face the combustion chamber. These studs are preferably distributed over these sides of the tubes as indicated. In the inter-tube spaces longer studs 400 are welded to the tubes in similar manner. As clearly indicated in the drawings these longer studs, projecting from adjacent tubes have their ends positioned approximately midway of the inter-tube spaces.

Along the side of the division wall tubes 98 facing the secondary furnace stage the spaces between the tubes are closed by highly conductive smooth metallic blocks 97. After the blocks 97 are firmly secured in place, the heat resisting ceramic refractory material 99 is tamped in place over the tubes and between the studs so as to form a ceramic refractory face or lining for the high temperature furnace stage.

Fig. 10 indicates a wall for the primary furnace stage. The wall tubes 70 have the short studs 402 welded thereto over their furnace faces in the same manner as the tubes 98. They also have a plurality of rows of the longer studs 404 welded to the tubes and arranged in the intertube spaces. The rows of these longer studs are parallel and the studs of adjacent rows are preferably divergent. These longer studs are also preferably arranged in staggered relationship so as to promote the bonding of the ceramic refractory 406 to the tubes. This refractory material is of the same character as that mentioned with reference to the description of the Fig. 9 wall, and it is preferably installed in the same manner.

In the Fig. 10 wall construction the sheet metal furnace casing is indicated at 408, and between this casing and the wall tubes 70 there are layers of heat insulating material 410 and 412. The latter preferably has higher heat resistance properties than the layer 410.

Fig. 11 indicates a "tube to tube" wall for the second furnace stage chamber. As here shown, the wall tubes 101 are very closely spaced and are bare along their furnace sides. On their opposite sides and between the furnace casing 414 and the tubes there are two layers 416 and 418 of insulating material corresponding in their properties to the layers 410 and 412 of the Fig. 10 wall construction.

The Fig. 12 modification includes circulators 167 directly connecting the water space of the drum 18 and the upper end of a downcomer 132. These circulators will serve to balance circulation and drum water level conditions when the predominating part of the water supplied to the upper ends of the downcomers is delivered thereto through the circulators 168 which directly connect the economizer outlet header 164 and the downcomer.

The embodiment of the invention indicated in Fig. 13 of the drawings may be said to involve a reversal of the Fig. 1 arrangement of the second furnace stage and the convection section. The latter expression is intended to refer to the superheater 302, and the economizer 304. These components of the system are arranged in a sequence similar to that of the corresponding parts of the Fig. 1 unit, and they are individually constructed in a similar manner. They are, however, located on the opposite side of the secondary furnace stage 305. The screen tubes 300 connect the front drum 306 with the water wall header 308 and the superheater consists of suspended coils of return bend tubes communicating with an inlet header 310 and an outlet header 312.

The economizer 304 similarly consists of return bend coils arranged horizontally and supported by cross headers 314, 316, and 318. The latter are connected into the boiler circulation by upright conduits 320 and 322 which are indicated as communicating at their upper ends with the steam and water separator drum 324.

The drums 306 and 324 are connected by steam circulators 326, and they are preferably supported, along with the other pressure parts of the system, in a manner similar to that particularly indicated in the description of Fig. 4 of the drawings.

The high temperature primary furnace stage 330 has its front wall and roof defined by the tubes 332 communicating at their lower ends with the header 334, and at their upper ends with the intermediate header 336. Riser tubes 338 establish communication between the header 336 and the drum 306. The furnace wall along the risers may include heat conducting wall blocks 339 similar to those shown in Fig. 9 of the drawings. They are preferably similarly secured to the tubes so as to present a smooth furnace face.

The side walls of the secondary furnace stage 305 are defined by wall tubes 342, which are covered by heat conducting wall blocks 343 to afford heat absorption capacity. These tubes directly connect the upper side wall headers 344 and the lower side wall headers 346. These headers are preferably connected into the circulation system of the boiler by such circulators and downcomers as those indicated in Figs. 3 and 7 of the drawings.

The floor of the primary furnace stage 330 is defined by floor tubes 350 which directly connect the header 334 and the intermediate hopper header 352. These tubes are arranged in a manner similar to the arrangement of the floor tubes of the furnace chamber 30 of the Fig. 1 system and they are similarly constructed to provide for the constant flow of slag therealong to the discharge end of the floor from which the slag drops into the hopper 354. The latter is provided with two sluiceways 356 and 358 for the continuous or periodic disposal of solids separated from the furnace gases in the three different stages of the system.

The ash pit, or hopper, of the Fig. 13 system may have its front wall arranged with a removable section similar to the section 100 of the Fig. 1 system and the Fig. 5 system, and for the same purpose. The opposite wall of the hopper inclines downwardly from the upper header 370 to the lower header 372. It is defined by the inclined tubes 374 which establish direct communication between these headers. The surface of this inclined hopper wall is provided by metallic blocks 376 preferably secured to the tubes and thermally bonded thereto.

Fuel is burned in the primary furnace stage 330 by a plurality of combination fuel burners 380, 382, and 384, shown as inter-tube burners discharging fuel between successive roof tubes of that chamber. The expression "combination fuel burners" is intended to connote burners which can handle a plurality of fuels simultaneously, or operate on any one of those fuels. Such fuels as natural or artificial gas, oil or pulverized coal, are examples.

While the burners shown in Fig. 13 are downshot burners it is also within the scope of the invention that the furnace chamber 330 may also be provided with horizontally directed burners such as the burner 260 shown in Fig. 5. These may also be combination fuel burners.

The division wall 360 of the Fig. 13 unit is defined by tubes 361 associated with such additional wall forming parts as those described with reference to the similar wall tubes of the Fig. 1 and Fig. 5 units. They are also arranged similarly at their lower parts to form furnace gas outlets. They also similarly extend through the furnace floor to connect with the header 352.

While the invention has been described with reference to the particular embodiments indicated in the accompanying drawings, it is to be understood that the invention is not limited to all of the details of the embodiments disclosed. The invention is rather, susceptible of embodiment in various combinations within the scope of the appended claims. Any one of the single embodiments disclosed may be modified, within the scope of the claims, by inclusion therewith of subject matter indicated in the other embodiments. For example, the high capacity installation indicated in Fig. 1 of the drawings may be modified by the inclusion of certain features of the embodiment indicated in Fig. 5 of the drawings. The boiler indicated in Fig. 1 may have its division wall, between the combustion chamber, and the radiant heat absorption chamber arranged vertically, corresponding to the arrangement of the wall 242 of the Fig. 5 embodiment. Again, the combustion chamber 30 of the Fig. 1 unit may be equipped with burners arranged in the same manner as the burners of the Fig. 5 embodiment. Also, the Fig. 1 unit may be installed with a single drum, after the manner of the Fig. 5 unit. These are merely examples of modifications which are considered to be within the scope of the invention.

With reference to the embodiment of the invention shown in Fig. 13, the Fig. 13 boiler may have burners arranged in the manner indicated in Fig. 5 and the pressure parts of the Fig. 13 installation may be maintained in their operating positions in a manner similar to that indicated in Fig. 4 of the drawings and described in the specification, with reference to Fig. 4. Again, the embodiments indicated in Figs. 1, 5, and 13 may be modified according to the disclosure of Fig. 12 and the description pertinent thereto.

Having described the invention with reference to certain preferred embodiments, the following claims clearly set forth the invention, according to the requirements of the statutes, and particularly R. S. 4888.

We claim:

1. In a two stage radiant boiler, a primary furnace stage including a high temperature combustion chamber having walls defined by fluid cooled tubes covered on their furnace sides with ceramic refractory material, means for burning pulverized fuel in said chamber, a second furnace stage including a furnace chamber disposed laterally of the primary stage, fluid cooled wall tubes connected into fluid circulation and having their sides directly exposed to combustion elements in the second stage, means forming an ash hopper beneath the second stage, a refractory covered fluid cooled furnace floor for the first stage sloping toward the hopper so as to continuously discharge combustion deposited solids into the hopper and prevent their accumulation in the first stage, a fluid cooled wall common to both furnace stages but terminating short of said floor at some positions so as to afford a furnace gas outlet through which combustion elements pass from the lower part of the first stage into the lower part of the second stage and thence upwardly, upright tubes constituting a part of a convection section laterally disposed with reference to the second stage and above the primary stage, and means near the lower ends of said upright tubes whereby combustion solids separated from the furnace gas by said tubes will be deflected and discharged into the second stage and thence into the hopper.

2. A two stage radiant boiler comprising, in combination, a continuous slag tap furnace having a floor constructed to maintain a layer of flowing slag thereon, means forming an outlet for furnace gases at the upper part of the furnace, a fuel burner projecting a stream of slag forming fuel through a vertically arranged U-shaped flow path of substantial length, said fuel stream and the consequent furnace gas stream changing direction while sweeping across a layer of slag flowing along the furnace floor in the same direction as the furnace gas stream, said action causing suspended slag particles in said furnace gas stream to separate and adhere to the slag layer and maintaining said layer in flowing condition, and a convection section including a bank of upright furnace wall risers constituting a bank of connection tubes extending across the path of the furnace gases and across said outlet.

3. A two stage radiant boiler associated with a superheater and comprising, in combination, water wall tubes connected into the boiler circulation and defining a primary furnace chamber of small volume lined with ceramic refractory material and associated with burners so as to provide a high temperature ignition and combustion zone in which intense combustion is promoted by the incandescence of the lining, means for burning a slag forming fuel in the primary chamber, water being circulated in the wall tubes so as to generate steam and absorb heat from the lining and thereby maintain the lining, other wall tubes defining a bankless secondary furnace chamber of larger volume than the primary chamber, said secondary chamber receiving the furnace gases and their suspended solids through a relatively small gas outlet from the primary chamber and presenting metallic heat absorbing wall surfaces acting to cool the gases and their suspended solids to such a temperature value that the solids are chilled and separated from the gases and to such a temperature value that the gases may be safely utilized over the surfaces of the convection section, the convection section including upright furnace wall tube risers presenting a radiant heat screen across a furnace gas outlet for the secondary chamber, tubular superheater elements disposed rearwardly of the screen and across the flow of the furnace gases, the arrangement of the screen and a secondary chamber gas outlet with reference to the gas outlet from the primary chamber being such that the screen and the superheater are disposed at a position opposite a fluid cooled wall area of much lower temperature than the wall area adjacent the primary chamber outlet, and means providing a tapered gas pass for the effective absorption of heat by the convection section beyond the screen.

4. A two stage radiant boiler associated with a high temperature superheater and comprising, in combination, water wall tubes connected into the boiler circulation and defining a primary furnace chamber lined with ceramic refractory material and associated with burners so as to provide a high temperature ignition and combustion zone in which intense combustion is continuously carried on and promoted by the incandescence of the ceramic refractory lining, water being circulated in the wall tubes so as to generate steam and absorb heat from the lining so as to maintain the lining, a lower header from which different rows of wall tubes extend to define opposite sides of the primary chamber, the tubes defining one side also defining the roof of said chamber and being of larger diameter than the tubes of the other row to proportion the flow of fluid in said rows, other wall tubes defining a secondary furnace chamber of larger volume than the primary chamber, said secondary chamber receiving the furnace gases and their suspended solids through a relatively small gas outlet from the primary chamber and presenting metallic heat absorbing wall surfaces acting to cool the gases to such a temperature value that the gases may be safely utilized over the surfaces of the convection section, the convection section including upright furnace wall tube risers presenting a radiant heat screen across a furnace gas outlet for the secondary chamber, and tubular elements presenting convection surface disposed rearwardly of the screen and across the flow of the furnace gases, the arrangement of the screen and a secondary chamber gas outlet with reference to the gas outlet from the primary chamber being such that the screen and the superheater are disposed at a position opposite a fluid cooled wall area of the secondary chamber of much lower temperature than the wall areas adjacent the primary chamber outlet.

5. In a high temperature high capacity radiant boiler, a furnace including a high temperature primary chamber constituting an ignition and combustion section and a large volume secondary furnace chamber into which the furnace gases flow from said section, means for burning fuel in the primary chamber, wall tubes presenting bare metal surfaces as walls of the secondary chamber to reduce the temperature of the furnace gases in that chamber, a convection section including furnace wall tubes arranged vertically across the flow of furnace gases from the secondary chamber, a superheater consisting of vertically arranged flat coils of return bend small diameter tubes positioned rearwardly of the furnace wall tubes, means for suspending the superheater coils, and a superheater gas pass wall inclined downwardly toward the secondary chamber, said gas pass wall forming with other walls a tapered gas pass decreasing in cross section away from the secondary chamber.

6. In a fluid heater, a slagging furnace, means for burning a slag forming fuel in the furnace, means forming a furnace gas outlet at the upper portion of the furnace and laterally thereof, vertically arranged steam generating furnace wall riser tubes extending across the furnace gas outlet at one side of the furnace and constituting a part of a convection section, means for minimizing slag deposits on said furnace wall tubes, said means including an arrangement whereby the burners project a stream of slag forming fuel toward the bottom of the furnace, means for causing said slag forming fuel to be burned in suspension at high temperatures while passing through a vertically arranged U-shaped flow path, means for causing the fuel stream to change direction upwardly while passing along the furnace floor to cause said slag particles to separate and deposit thereon, and means for causing the deposited slag particles to continuously flow over and from the furnace floor without forming a slag pool thereon, means forming an ash pit below the discharge end of the furnace floor, and means near the base of the convection section formed by the steam generating tubes for causing additional solids from the gases to pass through a part of the furnace to the ash pit.

7. A two stage radiant boiler associated with a superheater and comprising, in combination, water wall tubes connected into the boiler circulation and defining a primary furnace chamber lined with ceramic refractory material and associated with burners so as to provide a high temperature ignition and combustion zone in which intense combustion is continuously carried on and promoted by the incandescence of the ceramic refractory lining, water being circulated in the wall tubes so as to generate steam and absorb heat from the lining so as to maintain the lining, other wall tubes defining a secondary furnace chamber of larger volume than the primary chamber, said secondary chamber receiving the furnace gases and their suspended solids through a relatively small gas outlet from the primary chamber and presenting metallic heat absorbing wall surfaces acting to cool the gases and their suspended solids to such a temperature value that the solids are separated from the gases and the latter may be safely utilized over the surfaces of the convection section, the convection section including upright furnace wall tube risers presenting a radiant heat screen across a furnace gas outlet from the secondary chamber, tubular elements forming the superheater disposed rearwardly of the screen and across the flow of the furnace gases, the arrangement of the screen and a secondary chamber gas outlet with reference to the gas outlet from the primary chamber being such that the screen and the superheater are disposed at a position opposite a fluid cooled wall area of much lower temperature than the wall areas adjacent the primary chamber outlet, and means providing a tapered gas pass for the effective absorption of heat by the convection section beyond the screen, said tubular superheater elements formed so as to constitute upright flat tubular coils including roof portions extending along the roof or top wall of the tapered gas pass.

8. In a radiant boiler associated with a multiple stage furnace, means including fluid cooled walls forming a radiant heat absorption chamber in which combustion may be completed, a high temperature ignition and combustion chamber disposed laterally of the absorption chamber at the lower part of the latter, means for burning a slag forming fuel in the high temperature chamber, said high temperature chamber discharging slag laden furnace gases laterally and through openings in an upright screen wall into the absorption chamber, a convection section including upright furnace wall riser tubes disposed above the high temperature chamber and at the same side of the absorption chamber, and a superheater and an economizer positioned above the high temperature chamber and at the same side of the absorption chamber, the superheater including long upright tubes arranged rearwardly of the riser tubes which extend across a furnace gas inlet of such large flow area that the impact of partially frozen ash particles on the tubes will not cause those particles to excessively stick to the riser tubes or superheater tubes.

9. In a natural circulation radiant boiler associated with a multiple stage furnace, furnace wall tubes defining a furnace chamber and connected as risers into boiler circulation, a fuel burner, upper drums at least one of which receives the discharge from said wall tubes, an external downcomer of large diameter connected at its lower portion with the furnace wall tubes, said downcomer communicating with the water spaces of both of said drums by external connections, means for confining the furnace gases so that they do not contact with the downcomer or said connections, and an economizer from which feed water passes to the upper portion of the downcomer.

10. In a radiant steam boiler of the type including a primary furnace chamber of small volume and high ignition and combustion temperatures, means for burning a slag forming fuel in the primary furnace chamber, a secondary furnace chamber of large volume receiving furnace gases from the primary chamber, a superheater, upright fluid conducting furnace tubes forming a superheater screen, and an economizer; the combination therewith of a primary furnace chamber lining consisting of ceramic refractory material maintained in a state of incandescence to promote high ignition and combustion temperatures, water tubes defining the walls of the primary chamber and connected into the boiler circulation so as to protect and maintain the ceramic refractory lining, fluid cooled tubes defining the walls of the secondary chamber and presenting wide areas of fluid cooled surfaces absorbing heat from the furnace gases and their suspended solids and also causing separation of the solids and cooling of the furnace gases below ash fusion temperatures and below temperatures at which the superheater tubes will be damaged, the secondary chamber opening out from the primary chamber and allowing the furnace gases a sufficient length of travel and a sufficient time interval in a radiant heat absorption zone to effect adequate heat absorption therefrom, the superheater consisting of spaced tubes, means for supporting the superheater in such a position that it will not be exposed directly to the intense radiant heat of the primary chamber, means including spaced furnace tubes positioned so as to act as a screen to protect the superheater tubes from the radiant heat of the combustion chamber, and a tapering section forming a gas path for the superheater, said tapering section including a lower wall which is inclined downwardly toward the lower part of the secondary chamber.

11. In a radiant boiler, steel framework constituting the boiler support, a steam and water drum positioned near the top of the framework and suspended therefrom, a small volume high temperature primary combustion chamber having its walls defined by fluid cooled tubes, said chamber being positioned at a substantial distance beneath said drum, a header or drum below the first drum and receiving the discharge from the wall tubes of the primary chamber, a convection section including upright screen tubes directly connecting the first drum with the second drum or header and extending across the path of the furnace gases, fluid cooled wall tubes connected to the first mentioned drum and defining a wall of a large volume low temperature secondary combustion chamber disposed laterally of the convection section and the primary chamber, other fluid cooled wall tubes defining other walls of the combustion chamber, a superheater including return bend coils positioned beyond the screen tubes with reference to gas flow, a counter-flow economizer positioned beyond the superheater, hangers secured at their upper ends to the framework and having their lower ends terminating at positions in or closely adjacent to a common datum plane extending horizontally at a position near the lower end of the means for suspending the drums, water cooled hanger tubes supporting walls of the primary chamber and extending therefrom to certain of said hangers at positions in or near said plane, said water cooled hanger tubes being connected into the boiler circulation and acting as hangers to support walls of the primary chamber beneath the superheater, means forming connections between said hangers and the tubes of the superheater and the combustion chamber wall in or near said datum plane, said drum having its ends projecting beyond the sides of the secondary combustion chamber, large diameter standpipes suspended from the projecting ends of the drum and constituting the downcomers for the system, said downcomers extending below all of the fluid cooled surfaces of the installation, and means connecting the lower portions of the downcomers with the wall tubes of the primary chamber and the secondary combustion chamber so that all of said wall tubes and the screen tubes act as risers discharging a mixture of steam and water into the drum.

12. In a radiant boiler of the tube including a small volume high temperature primary furnace chamber in which high ignition and combustion temperatures are maintained, a large volume secondary furnace chamber for radiant heat absorption receiving furnace gases from the primary chamber, a superheater, upright fluid conducting tubes forming a superheater screen, and an economizer; the combination therewith of a primary chamber lining consisting of ceramic refractory material maintained in a state of incandescence to promote high ignition and combustion temperatures, water tubes defining the walls of the primary chamber and connected into the boiler circulation so as to protect and maintain the ceramic refractory lining, fluid cooled tubes defining the walls of the secondary chamber and presenting wide areas of fluid cooled surfaces absorbing heat from the furnace gases and their suspended solids and also causing separation of the solids and cooling of the furnace gases below temperatures at which the superheater tubes will be damaged, the secondary chamber opening out from the primary chamber and allowing the furnace gases a sufficient length of travel and a sufficient time interval to substantially complete the cooling of the furnace gases, the superheater consisting of spaced tubes, means for supporting the superheater in such a position that it will not be exposed directly to the intense radiant heat of the primary chamber, means including spaced tubes positioned so as to act as a screen to protect the superheater tubes from the radiant heat of the secondary chamber, and a tapering section forming a gas path for the screen tubes and the superheater, said tapering section including a lower wall which is inclined downwardly toward the lower part of the secondary chamber.

13. In a steam generator, a furnace provided with a lateral combustion gas outlet at the upper part thereof, water cooled wall tubes lining the walls of the furnace, upright screen tubes extending across the outlet, means connecting the screen tubes into the fluid system of the generator, the screen tubes acting as risers for subjacent furnace wall tubes, means providing an ash disposal zone at the bottom of the furnace, means forming a gas passage extending laterally from said outlet, said last named means including upper and lower boundary surfaces converging away from said outlet, a superheater including a plurality of transversely adjacent upright tubular elements in said gas passage, said lower boundary surface being inclined downwardly toward the furnace and said zone, and means for burning a slag or ash releasing fuel in the furnace.

14. In a two stage water tube steam boiler attaining such co-ordination of fuel burning and fluid heat exchange that high rates of heat liberation and high rates of radiant heat absorption at large temperature differentials result in the economical production of large quantities of high temperature high pressure steam for power production, means including water wall tubes defining the high temperature combustion chamber of the primary stage of the boiler, means for introducing a mixture of fuel and air into the combustion chamber in a direction to cause slag to be deposited on the floor of said chamber and to maintain the surface of the slag in flowing condition, a superheater, means forming a second stage furnace chamber disposed adjacent the primary stage and constituting the radiant heat absorption section in which the furnace gases and their suspended non-gaseous particles from the primary stage have their temperatures decreased so as to permit effective and safe operation of the superheater from the standpoint of metal temperatures as well as that of slag deposits, both of said chambers having water cooled walls with the walls of the second stage chamber presenting metallic furnace faces capable of rates of heat transfer higher than those of the primary stage, a division wall including fluid cooled tubes separating the primary stage from the second stage in such a way that this wall is subjected to high temperature furnace gases on both sides, and a tubular screen extending across the path of the furnace gases forwardly of the superheater with the screen and the superheater being disposed above the primary stage in such position that neither is exposed to radiant heat directly transmitted from the primary stage.

15. In a two stage radiant steam generator involving such co-ordination of fuel burning and fluid heat exchange that high rates of heat liberation and high rates of radiant heat absorption at large temperature differentials result in the economical production of large quantities of high temperature high pressure steam for power production, means forming the high temperature combustion chamber of a primary stage of the generator, means for introducing a mixture of fuel and air into the combustion chamber in a direction to cause slag to be deposited on the floor of said chamber and to maintain the surface of the slag in a molten condition, a superheater, means forming a second stage furnace chamber disposed adjacent the primary stage and constituting the radiant heat absorption section in which the furnace gases and their suspended non-gaseous particles from the primary stage have their temperatures decreased so as to permit effective and safe operation of the superheater from the standpoint of metal temperatures as well as that of slag deposits, both of said chambers having water cooled walls with the walls of the second stage chamber being capable of higher rates of heat transfer, a division wall including fluid cooled tubes separating the primary stage from the second stage in such a way that this wall is subjected to high temperature furnace gases on both sides, and a tubular screen extending across the path of the furnace gases forwardly of the superheater with the screen and the superheater being disposed above the primary stage in such position that neither is exposed to radiant heat directly transmitted from the primary stage.

16. A water tube steam boiler associated with a superheater and an economizer and comprising, in combination, water wall tubes connected into the boiler circulation and defining a primary furnace chamber lined with ceramic refractory material and associated with burners so as to provide a high temperature combustion zone in which combustion is effected at high rates, water being circulated in the wall tubes so as to generate steam and absorb heat from the lining so as to maintain the lining, other wall tubes defining a secondary furnace chamber of larger volume than the primary chamber, a division wall including fluid cooled tubes separating the primary furnace chamber from the secondary furnace chamber in such a way that the wall is subjected to high temperature furnace gases on both sides, said secondary chamber receiving the furnace gases and their suspended solids through a relatively small division wall gas outlet from the primary chamber and presenting metallic heat absorbing wall surfaces acting to cool the gases and their suspended solids to such a temperature value that the solids are separated from the gases and the latter may be safely utilized over the surfaces of the convection section, and a convection section including upright furnace risers presenting a radiant heat screen across a furnace gas outlet for the secondary chamber, a superheater including tubular elements disposed rearwardly of the screen and across the flow of the furnace gases, the arrangement of the screen and the secondary chamber gas outlet with reference to the gas outlet from the primary chamber being such that the screen and the superheater are disposed at such a position that they are not exposed to direct radiant heat of the primary chamber.

17. In a two stage water tube steam boiler, means forming the high temperature combustion chamber of the primary stage, said means including water wall tubes connected into the boiler circulation and covered on their furnace sides with ceramic refractory material held in good thermal relation to the wall tubes, means introducing a mixture of fuel and air into said chamber for effecting high rates of combustion therein, water walls defining a second stage furnace chamber receiving high temperature furnace gases from the primary stage, the latter walls presenting metallic surfaces directly exposed to the furnace gases and being capable of a high degree of heat absorption, a convection superheater having spaced tubular elements exposed to heat from the furnace gases after the latter have been cooled in the second stage, the superheater being disposed laterally of the second stage and above the primary stage in such a manner that it is not subject to radiant heat directly transmitted from the high temperature primary stage, spaced fluid cooled screen tubes disposed across the path of the furnace gases and subject to contact therewith before the gases contact with the superheater elements, and another set of fluid cooled screen tubes extending across the gas outlet through which the gases pass from the primary stage to the second stage, and means for connecting both sets of screen tubes into the boiler circulation.

ERVIN G. BAILEY.
THOMAS C. TOOMEY.
ROLFE SHELLENBERGER.

CERTIFICATE OF CORRECTION.

Patent No. 2,231,872.  February 18, 1941.

ERVIN G. BAILEY, ET AL.

It is hereby certified that error appears in the printed specification of the above numbered patent requiring correction as follows: Page 1, first column, line 35, for the word "coils" read --coals--; page 7, first column, line 30, for "ge" read --be--; page 10, second column, line 13, claim 2, for "connection" read --convection--; page 12, second column, line 16, claim 12, for the word "tube" read --type--; and that the said Letters Patent should be read with this correction therein that the same may conform to the record of the case in the Patent Office.

Signed and sealed this 29th day of July, A. D. 1941.

Henry Van Arsdale,
Acting Commissioner of Patents.

(Seal)